Sept. 28, 1926. 1,601,299
A. G. DE WALDO
SLITTING AND CORRUGATING MACHINE
Filed August 28, 1924 5 Sheets-Sheet 1
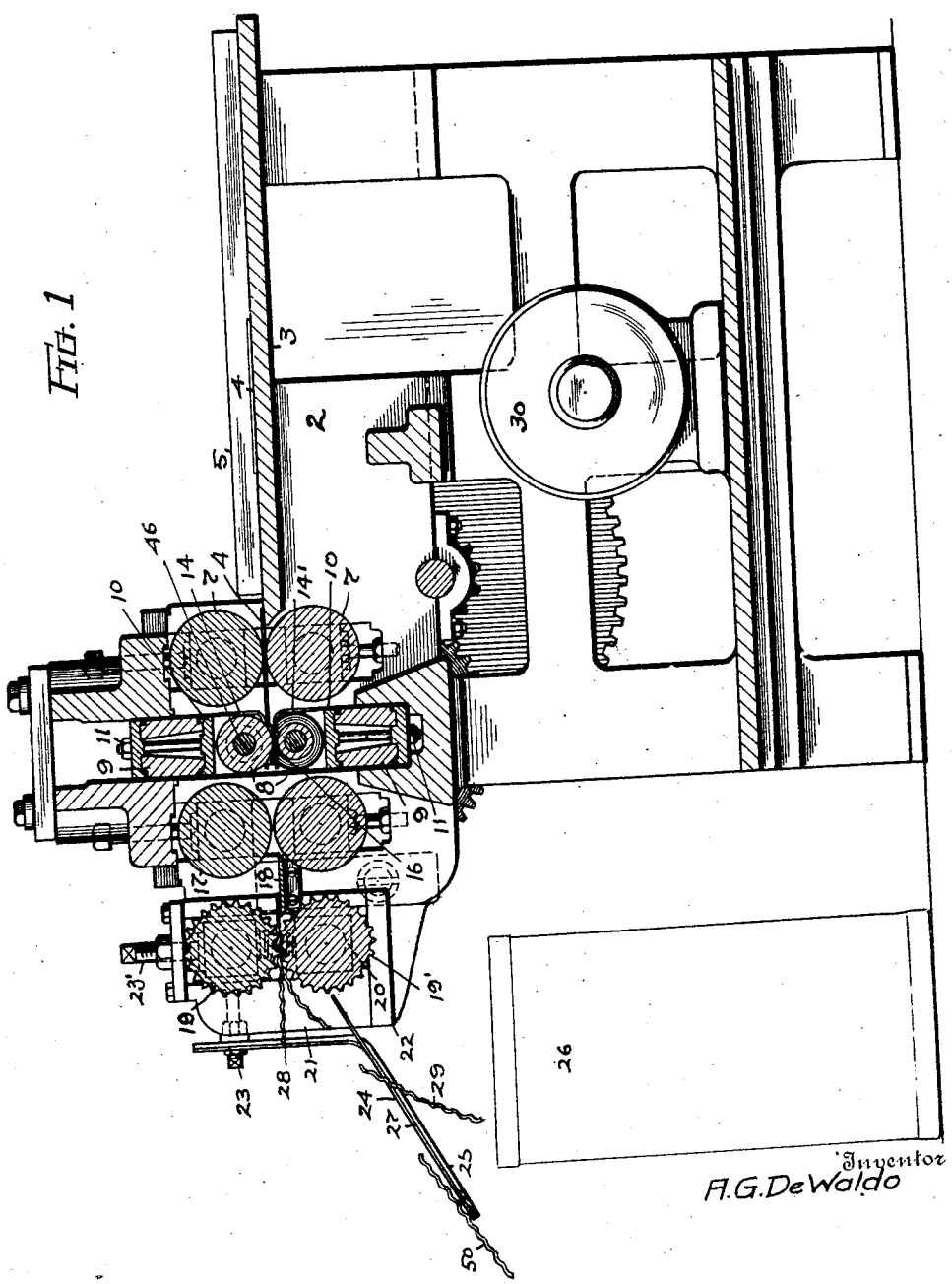

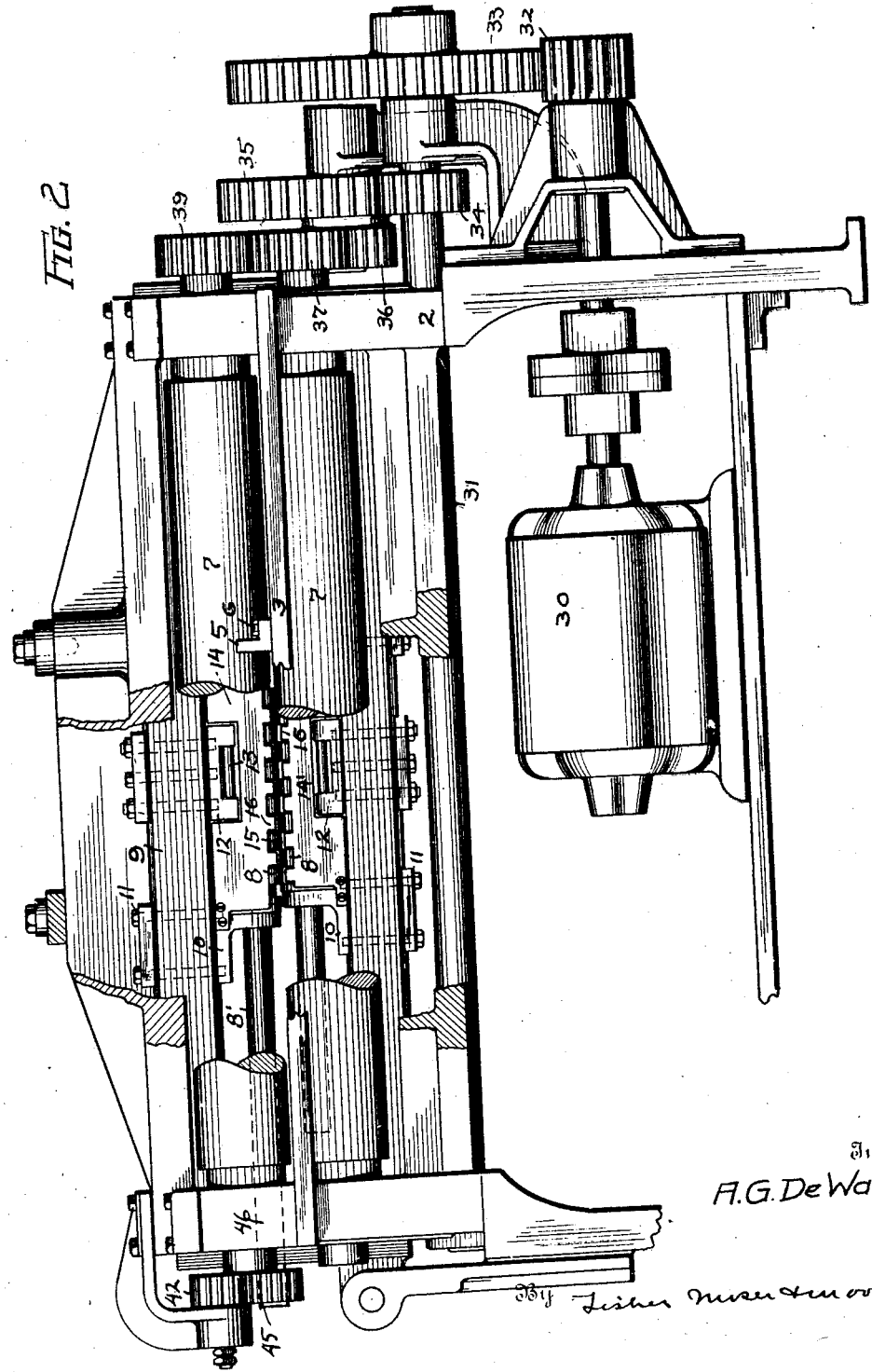

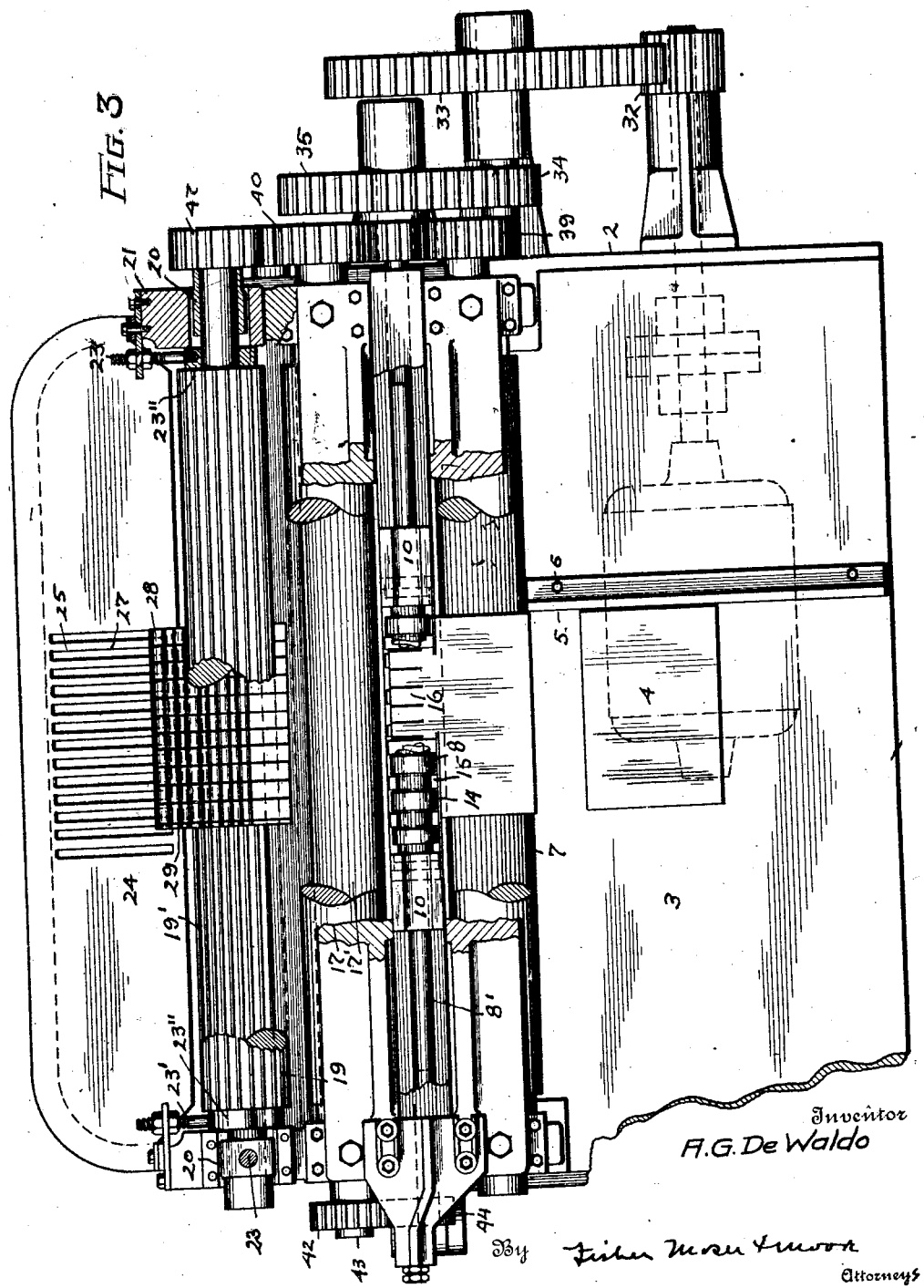

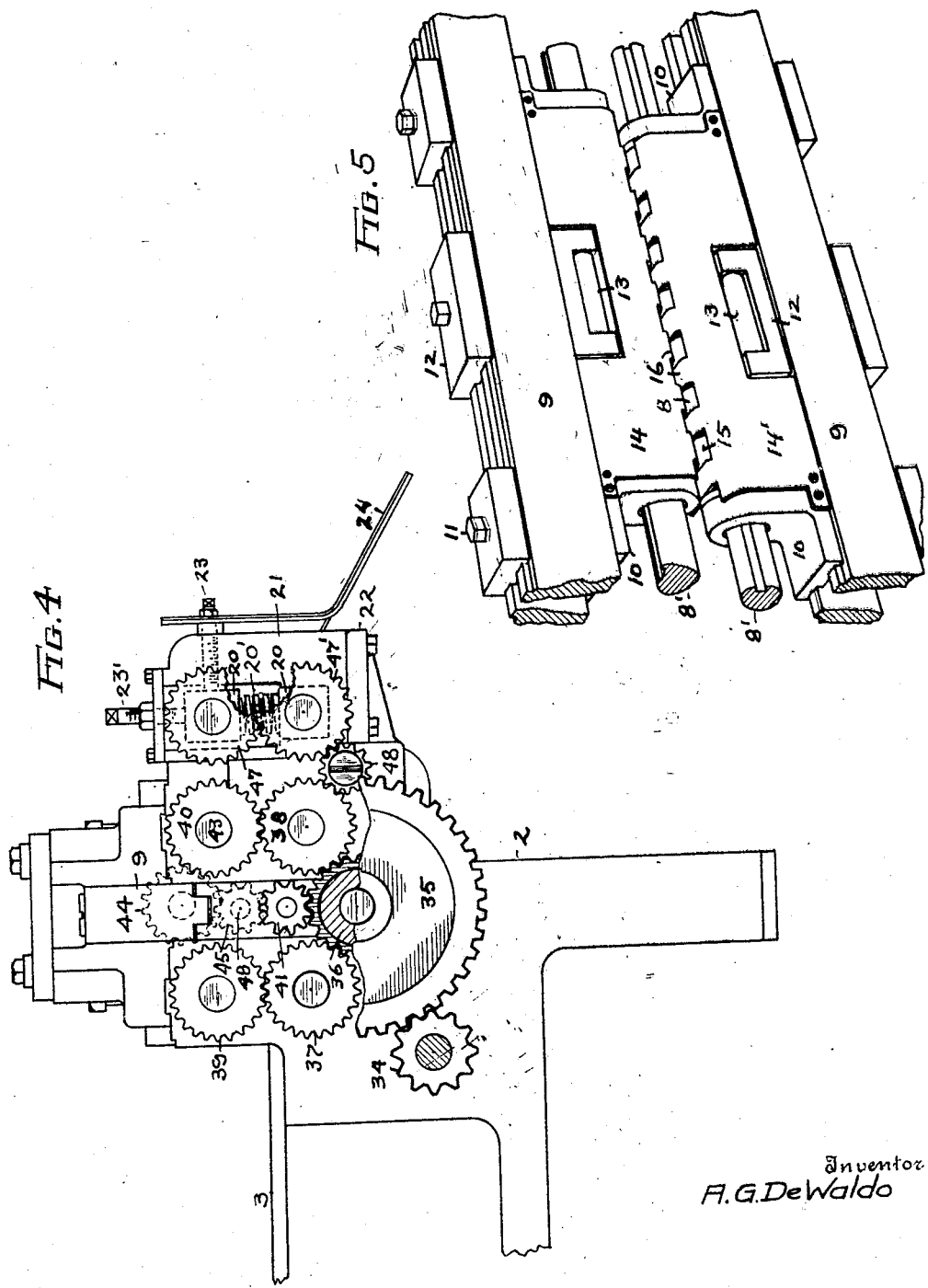

Sept. 28, 1926.

A. G. DE WALDO 1,601,299

SLITTING AND CORRUGATING MACHINE

Filed August 28, 1924     5 Sheets-Sheet 5

Inventor
A.G.DeWaldo

By *Fisher, Moser & Moon*
Attorneys

Patented Sept. 28, 1926.

1,601,299

UNITED STATES PATENT OFFICE.

ALFONSE G. DE WALDO, OF WARREN, OHIO.

SLITTING AND CORRUGATING MACHINE.

Application filed August 28, 1924. Serial No. 734,601.

My invention relates to an improvement in slitting and corrugating machines, my general object being to provide a machine which is particularly constructed to cut sheet-metal into strips and to corrugate the strips. My specific objects are, to provide means adapted to facilitate the feeding of separate sheets of metal into a set of cutting or slitting rollers; to provide a series of interspaced interlapping rollers adapted to cut each sheet into a plurality of strips: to provide simple and effective means adapted to guide a plural number of parallel strips through the cutting rollers and to guard against mal-function in operations or deviation in the straight course of travel of the strips; to provide a pair of corrugating rollers adapted to corrugate the cut strips; means adapted to support the corrugated rollers in a demountable position in the line of travel of the cut strips; to provide means adapted to adjust the working relation of these rollers to permit the corrugated strips to be freely discharged therefrom and directed in a straight course and deposited by gravity upon an inclined discharge plate; and to provide means adapted to separate and segregate the waste or trimmings in discharging the finished corrugated product.

In the accompanying drawings of the invention, Fig. 1 is a vertical section longitudinally of the machine, showing the work passing through the several sets of rollers.

Fig. 2 is an end elevation of the machine with portions thereof broken away to disclose the cutting rollers and the guard and guide members associated therewith.

Fig. 3 is a top view of the machine with parts thereof broken away to disclose the work as it appears while being operated upon at different places within the machine.

Fig. 4 is a side elevation of a part of the machine showing the gearing for operating the several sets of rollers.

Fig. 5 is an enlarged perspective view of the cutting rollers and the supporting parts therefor, including the guard members, viewed from the receiving side.

Figure 6:
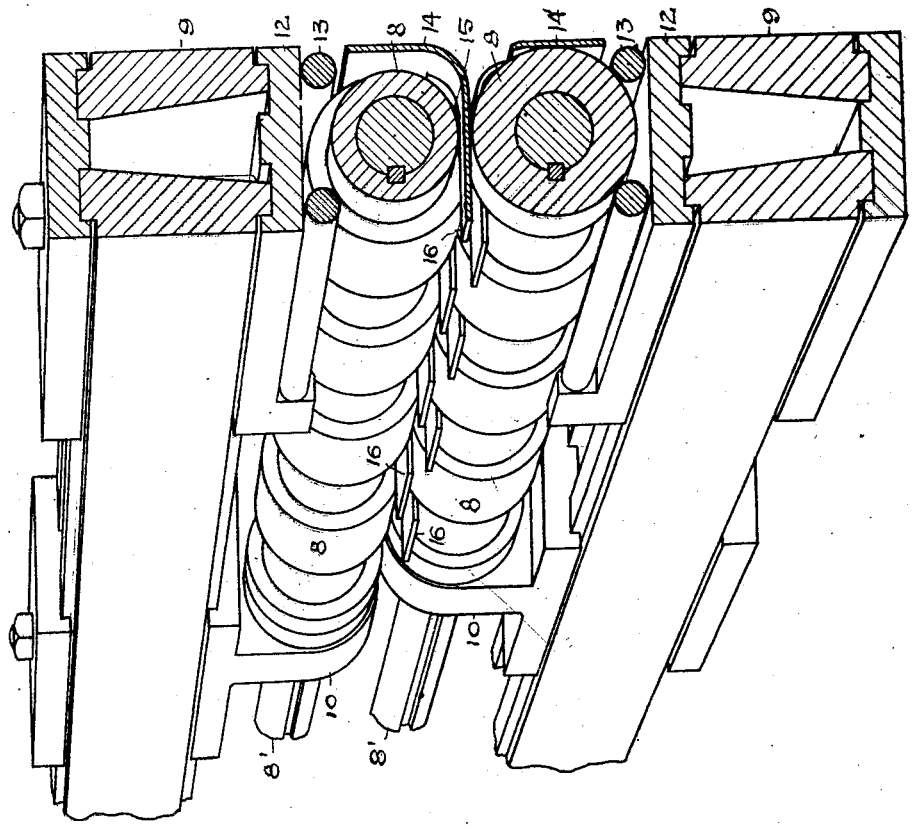
Fig. 6 is an enlarged perspective view of the same parts delineated in Fig. 5, viewed from the discharge side and the rollers and guard members being shown in cross section.

The machine comprises a main frame 2 having a flat table 3 at its top upon which rectangular pieces 4 of sheet metal of any predetermined size may be seated in contact with an aligning guide 5 fixed in a transversely adjustable position upon table 3 by bolts or screws 6. A pair of smooth gripping and feeding rolls 7—7 extend transversely of the main frame at the inner end of table 3, and when the metal sheets are fed singly into the bite of the rolls the sheet is gripped and forced onward to a series of narrow shearing or stripping rollers 8—8 arranged in pairs one above the other in interlapping relation to produce a shearing cut, each roller corresponding in width to the width of the strips to be sheared or cut from the metal sheet 4. These stripping rollers are slidably splined on separate shafts 8'—8' journaled in the opposite ends of a pair of cross bars 9—9 which are removably seated within a vertical pocket or space extending transversely of the machine. Each bar is slotted longitudinally and carries clamping brackets 10—10 and clamping bolts 11—11 adapted to permit the stripping rollers to be shifted and set in different working positions transversely of the machine. The stripping rollers may also be removed and others of different size, length or shape substituted therefor. A set of clamping plates 12—12 carrying pressure-resisting rollers 13 are also affixed to bars 8, and a pair of guard members 14—14' in the form of plates are detachably fastened by screws to brackets 10—10 at the receiving side of the stripping rollers. The series of stripping rollers on one shaft are spaced apart the requisite distance to receive the companion rollers on the other shaft, and the intermediate spacing portions 15 between the stripping rollers are of reduced diameter to provide a gap or space through which a guiding and guarding finger 16 may extend to the discharge side of the rollers. Thus, each guard member or plate 14 is formed with a series of spaced fingers 16 bent at right angles to the main body of the plate which is fastened upright in front or at the receiving side of the shearing or slitting rollers, and the upper guard member 14 and its fingers 16 are stationed opposite the upper series of shearing rollers above the top of the sheet of metal being operated upon, and the lower guard member 14′ and its fingers 16 are stationed beneath the sheet of metal opposite the lower set of rollers. The upper and lower guarding fingers lie in different horizontal planes to permit the stock to be sheared into parallel strips and to prevent the strips from curling and deviating from a straight forward course as they are being cut from the main body of the sheet, thereby permitting rapid operation of the machine without mal-function. In cutting the sheet into parallel strips the tendency of alternate strips is to spread or curl apart in opposite directions, and the two sets of fingers in different horizontal planes on opposite sides of the piece of sheet metal guard and prevent such spreading or curling of the cut strips and also direct the strips on a straight horizontal line into a pair of guide rolls 17—17′ mounted parallelly opposite the discharge side of the shearing rollers. Guide rolls 17—17′ bring the alternately higher and lower strips back to the same horizontal plane and carry all the cut strips parallelly together over a short flat shelf 18 and into the loosely meshing teeth of a pair of longitudinally corrugated rolls 19—19′, thereby corrugating all the cut strips simultaneously.

The corrugated rolls are mounted on shafts or trunnions journaled in separate boxes 20—20 seated within separate housings 21 which are removably mounted upon rigid extensions 22 at the end of the main frame to permit the corrugated rollers and their common supports to be readily attached and detached. The journal boxes 20 for the upper corrugated roll 19 are movably supported within the housings to permit them to be adjusted vertically and horizontally and thereby place the teeth or ribs of the upper roll 19 in different meshing positions with the teeth or ribs of the lower roll 19′. The double adjustment permits the strips to be corrugated in different degrees and also permits the direction of movement of the corrugated product to be controlled, it being understood that the strips are apt to curl or cling to the rolls or deviate from their straight course while being discharged unless the teeth are properly interspaced. A spiral compression spring 20′ is preferably placed between the upper and lower journal boxes 20 to carry or relieve the weight of the upper roll and to keep the teeth spaced apart so as not to corrugate the strips too deeply, and metal sheets or strips of different thickness may also be thereby accommodated.

The means for adjusting and fixing the position of the journal boxes 20 and the corrugating rolls comprise vertical adjusting screws 23′ and horizontal adjusting screws 23. The vertical screws 23′ engage or connect with boxes 20 and extend upwardly above the housings, while the horizontal screws 23 extend through a plate bolted upon the front of the housing and connect with collars 23″ sleeved upon the reduced shaft portions of the upper corrugated roll 19, see Figs. 3 and 4.

In the present machine the corrugated strips are also delivered upon an inclined discharge plate 24 having a central grating 25 to permit the trimming or waste piece 29 at one side edge of the sheet to be separated from the main product and at the same time discharged into a separate pile or into a separate container 26 placed beneath the grating. As shown, grating 25 is formed by making a series of parallel slots 27 in plate 24, each slot being of less width than the corrugated strips 28 which have been cut to a predetermined size by the shearing rollers. Consequently the wider corrugated strips will not pass through the slots but slide by gravity down the inclined plate, while the narrower trimming or edge piece 29 passes downward through the slotted plate as shown in Fig 1.

Any suitable power means may be used to operate the rolls. As exemplified herein, an electric motor 30 is mounted upon a shelf beneath table 3 to drive a countershaft 31 by means of a pinion 32 and gear 33. Countershaft 31 in turn carries a pinion 34 meshing with a large gear 35 adapted to rotate a stub shaft carrying a pinion 36, which serves to drive separate gears 37 and 38 fixed upon the outer ends of the shafts for the lower gripping rolls 7′ and guide rolls 17′. The upper gripping roll 7 and guide roll 17 are driven by gears 39 and 40 which mesh with gears 37 and 38, respectively. The lower shearing rollers are rotated by a small spur gear 41 meshing with pinion 36, and the upper shearing rollers 8 are driven by gearing located upon the opposite side of the machine and deriving their motion from a gear 42 fixed to the shaft 43 of upper guide roll 17 and meshing with an idler gear 44 which meshes in turn with a small spur gear 45 fixed on the outer end of shaft 46 for the upper shearing rollers 8.

Figures 7, 8:
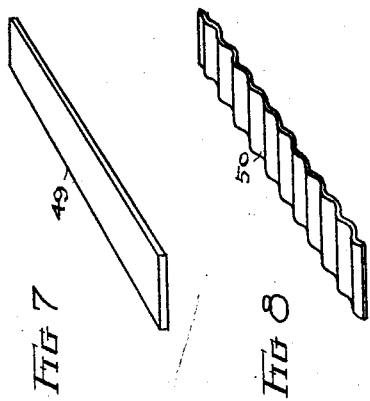
Fig. 7 is a perspective view of one of the cut strips as it appears before being corrugated.
Fig. 8 is a perspective view of the corrugated strip.

The corrugated rolls are also driven by the train of gearing hereinbefore described, a pair of meshed spur gears 47—47′ being fixed to the respective end shafts for said rollers at one side of the main frame where an idler gear 48 is provided to transmit the power from gear 38 to gear 47′. This gear connection permits free separability of gear 47′ from idler gear 48 when mountings 21 and are corrugated rolls are bodily removed from the end of the machine, a proceeding which may be resorted to in substituting other corrugated rolls or in the event that only plain strips 49, see Fig. 7, are to be produced by the machine. The corrugated product 50, Fig.

8, may be of any desired length and width, and it is used extensively as a wall tie.

The guard plates 14 and fingers 16 may be mounted in other ways than as shown without departing from the spirit and scope of my invention, and therefore the invention in its broader aspects is not necessarily limited to the angular form of guard plate and mode of mounting the same herein described and shown.

I claim as my invention:

1. A slitting and corrugating machine, comprising rolls adapted to grip and feed a sheet metal sheet, working pairs of rotatable interlapping shearing rollers adapted to cut said sheet into a multiple of parallel strips, a pair of guard means associated with corresponding shearing rollers formed with guide means to guide the cut strips in multiple, and corrugating rolls adapted to receive and corrugate the strips in multiple.

2. A slitting and corrugating machine, comprising rolls adapted to grip and feed a sheet metal sheet, a series of shearing rollers adapted to trim and cut said sheet into a multiple of parallel strips, a pair of stationary guard means associated with corresponding shearing rollers having guide means extending between said rollers to guide the cut strips in multiple, corrugating rolls adapted to receive and corrugate the strips in multiple, and means adapted to separate and segregate the trimmings cut from the sheet.

3. A slitting and corrugating machine, comprising working pairs of rotatable interlapping shearing rollers adapted to shear a metal sheet into parallel strips, in combination with co-operating pairs of guarding and guiding means for the cut strips arranged in spaced relationship on opposite sides of the plane of travel of the sheet between said rollers.

4. A slitting and corrugating machine, comprising rotatable interlapping shearing rollers adapted to cut a sheet of metal in a plurality of parallel strips, in combination with a pair of stationary guarding means, each having a series of fingers extending between the rollers, alternately arranged to each other and in different planes opposite said shearing rollers and adapted to guard the cutting of said strips.

5. A slitting and corrugating machine, comprising working pairs of interlapping shearing rollers, parallel bars for corresponding rollers and brackets longitudinally slidable thereon adapted to support said rollers, and a pair of guard plates affixed to said corresponding slidable brackets each having guiding fingers alternately arranged and extending between the rollers opposite the shearing edges thereof.

6. A slitting and corrugating machine, comprising a set of slitting rollers adapted to cut a sheet of metal into parallel strips, and a pair of corrugated rolls for corrugating said cut strips, including means adapted to adjust the meshing relation of the pair of corrugated rollers in both vertical and horizontal directions to promote the discharge of the strips.

7. A slitting and corrugating machine, comprising a set of slitting rollers adapted to cut a sheet into strips, in combination with a pair of corrugated rollers for corrugating the strips, journal boxes for said corrugating rollers, housings for said boxes, and means for adjusting and setting said boxes in different vertical and horizontal positions to vary the relative working position of the corrugated rollers to each other.

In testimony whereof I affix my signature.

ALFONSE G. DE WALDO.